(12) United States Patent
Miyachi et al.

(10) Patent No.: US 6,709,166 B1
(45) Date of Patent: Mar. 23, 2004

(54) CONNECTOR ASSEMBLY WITH MULTI-PART HOUSING

(75) Inventors: Akihiro Miyachi, Fuchu (JP); Masashi Seto, Kanagawa (JP); Kazuhiro Shimada, Kawasaki (JP); Hideo Tamura, Kitakyushu (JP); Kenji Watanabe, Atsugi (JP)

(73) Assignees: Toshiba Molex Incorporated, Kawasaki (JP); Sony Corporation, Tokyo (JP)

( * ) Notice: Subject to any disclaimer, the term of this patent is extended or adjusted under 35 U.S.C. 154(b) by 172 days.

(21) Appl. No.: 09/570,123

(22) Filed: May 12, 2000

(30) Foreign Application Priority Data

Jun. 1, 1999 (JP) .......................... 11-153200

(51) Int. Cl.[7] ................................................ G02B 6/38
(52) U.S. Cl. ........................................................ 385/56
(58) Field of Search ................................ 385/56, 92, 93, 385/76

(56) References Cited

U.S. PATENT DOCUMENTS

| | | | | |
|---|---|---|---|---|
| 5,307,435 A | * | 4/1994 | Chihara | 385/92 |
| 5,684,903 A | * | 11/1997 | Kyomasu et al. | 385/93 |
| 5,930,426 A | * | 7/1999 | Harting et al. | 385/56 |
| 6,142,677 A | * | 11/2000 | Sato et al. | 385/72 |
| 6,155,724 A | * | 12/2000 | Ichino et al. | 385/92 |
| 6,215,931 B1 | * | 4/2001 | Risch et al. | 385/109 |
| 6,220,764 B1 | * | 4/2001 | Kato et al. | 385/92 |

* cited by examiner

*Primary Examiner*—Khiem Nguyen
(74) *Attorney, Agent, or Firm*—Romi N. Bose; A. A. Tirva

(57) ABSTRACT

A connector assembly includes a multi-part housing for mating with a complementary connecting device. The housing has a first housing part of a first, resilient plastic material and includes a resilient latch portion for latching engagement with the complementary connecting device. The housing has a second housing part of a second plastic material with less resiliency than the first plastic material and includes a cavity for receiving and retaining an operative component of the connector assembly.

18 Claims, 3 Drawing Sheets

CONNECTOR ASSEMBLY WITH MULTI-PART HOUSING

FIELD OF THE INVENTION

This invention generally relates to the art of connector assemblies, such as fiber optic connector assemblies, electrical connector assemblies and the like.

BACKGROUND OF THE INVENTION

Connector assemblies, whether they are fiber optic connector assemblies or electrical connector assemblies, often include a pair of mating plug and receptacle connectors, sometimes called male and female connectors. The connectors typically include dielectric housings which terminate the optical fibers or electrical wires. The housings most often are molded of dielectric plastic material. The molded plastic housings of the respective mating connectors often include some form of integrally molded latching means to hold the two connectors in mated condition.

For instance, one of the mating connectors typically includes a flexible latch arm molded integrally with the connector housing for engaging a latch boss, recess or the like on the housing of the other mating connector. The latch arm is of a cantilevered configuration. Therefore, the housing must be fabricated of a plastic material which provides sufficient resiliency so that the latch arm can flex during repeated mating and unmating of the connector assembly.

Unfortunately, the flexibility of the plastic material for the housing with the flexible latch arm has disadvantages where plastic flexibility is not desired. For instance, the housing may also be used to mount or contain an operative component of the connector assembly. In a fiber optic connector assembly, one of the connectors may mount a photodiode or light-emitting diode in a cavity in the housing in-line with the optical fiber of the mating connector. This optical element often is press-fit into a cavity in the housing and held rigidly in position without extraneous retaining means. In fact, the housing may be heated to enable the component to be press-fit into the cavity. Unfortunately, if the housing is fabricated of flexible plastic material, such as a housing with a flexible latch arm, the housing may be deformed by forcing the component into its cavity and even be permanently deformed if heat is applied thereto.

The present invention is directed to solving this dilemma and related problems by providing a multi-part housing with one part of a given resilient plastic material having a resilient latch portion, along with a second housing part having a more rigid plastic material sufficient for receiving and retaining an operative component of the connector assembly.

SUMMARY OF THE INVENTION

An object, therefore, of the invention is to provide a new and improved connector assembly of the character described.

In the exemplary embodiment of the invention, the connector assembly includes a multi-part housing for mating with a complementary connecting device. The housing has a first housing part of a first, resilient plastic material and includes a resilient latch portion for latching engagement with the complementary connecting device. The housing has a second housing part of a second plastic material having less resiliency than the first plastic material and including a cavity for receiving and retaining an operative component of the connector assembly.

Generally, the second plastic material has a greater amount of filler than the first plastic material. The second plastic material, thereby, has a lesser coefficient of linear expansion than the first plastic material, and the second plastic material has a higher elastic modulus than the first plastic material.

Specifically, the first plastic material has a glass fiber filler and the second plastic material has a carbon filler. The glass fiber filler may be on the order of 15%, by weight, of the content of the first plastic material. The carbon filler may be on the order of 40%, by weight, of the content of the second plastic material. The first and second plastic materials may be of polybutylene terephthalate resin material.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
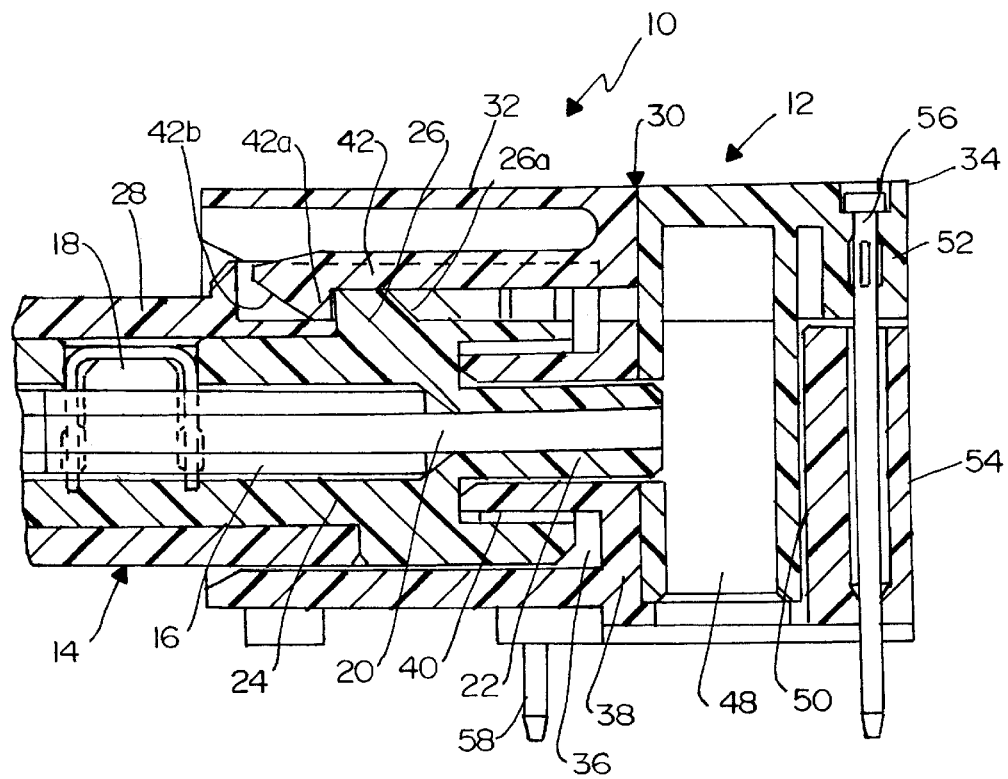
FIG. 1 is a vertical section through a connector assembly embodying the concepts of the invention.
Figure 2:
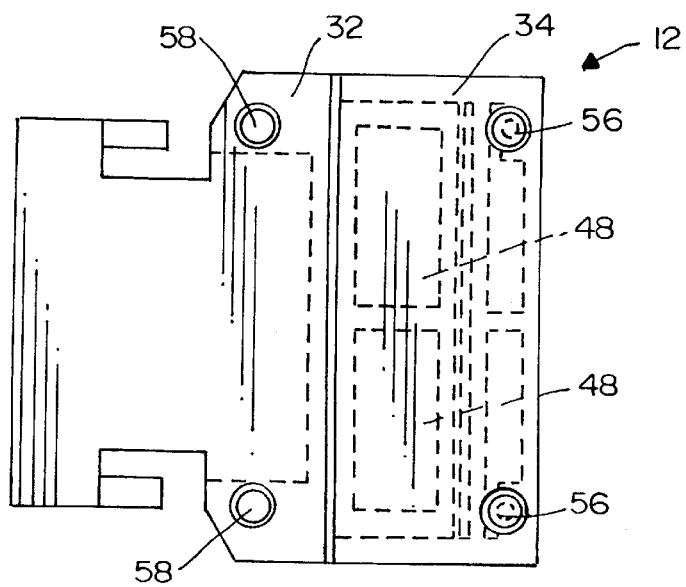
FIG. 2 is a top plan view of the receptacle connector of the assembly.
Figure 3:
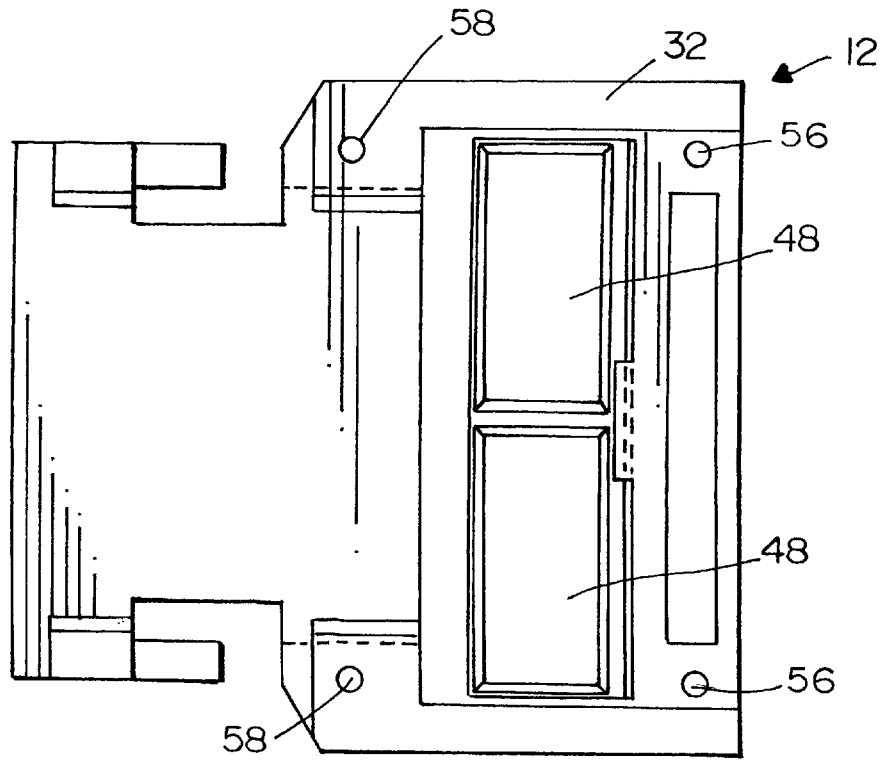
FIG. 3 is a bottom plan view of the receptacle connector.
Figure 4:
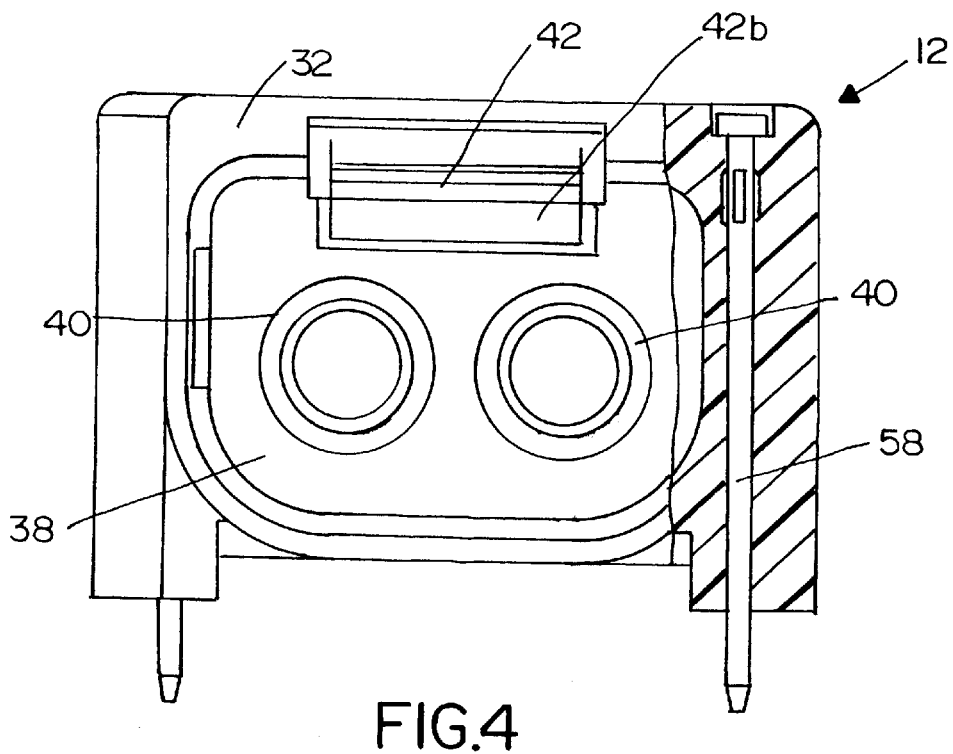
FIG. 4 is a front elevational view, partially in section, of the receptacle connector.
Figure 5:
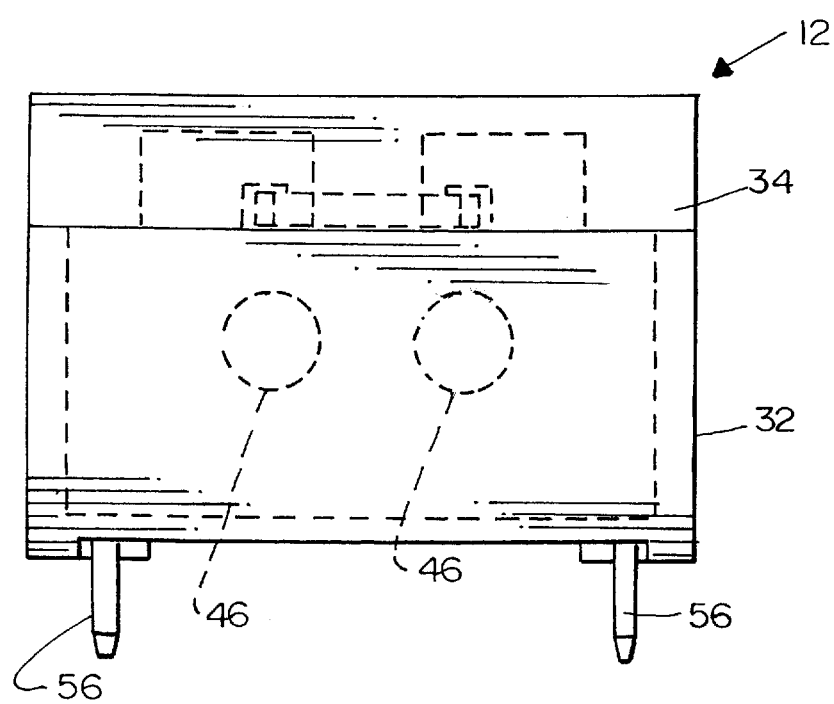
FIG. 5 is a rear elevational view of the receptacle connector.

Referring to the drawings in greater detail, and first to FIG. 1, the invention is embodied in a connector assembly, generally designated 10, which includes a receptacle connector, generally designated 12, for mating engagement with a complementary connecting device in the form of a plug connector, generally designated 14. In the preferred embodiment, connector assembly 10 is a fiber optic connector assembly and mating connector 14 is a fiber optic plug connector insertable into receptacle connector 12 which mounts one or more optical elements, as described hereinafter. However, it should be understood that the invention can be used with other types of connector assemblies, such as electric connector assemblies. Many different connector assemblies include mating receptacle and plug connectors or female and male connectors.

With that understanding, fiber optic plug connector 14 terminates an optical fiber cable 16 which is held in the connector by a clamp 18. The cable is stripped to expose its core fiber 20 which projects into an end plug portion 22 of a housing 24. The housing may be of plastic material and includes a latch boss 26 projecting outwardly therefrom. A sheath 28 may partially surround housing 24.

Referring to FIGS. 2–5 in conjunction with FIG. 1, receptacle connector 12 of connector assembly 10 includes a multi-part housing, generally designated 30, comprised of a first housing part 32 and a second housing part 34. First housing part 32 has a plug-receiving receptacle 36 forwardly of a rear wall 38 for receiving plug connector 14. A pair of cylinders 40 project from rear wall 38 for receiving a pair of the end plug portions 22 of the plug connector. In other words, in the illustrated embodiment, fiber optic cable 16 is bifurcated to include a pair of core fibers 20 extending into a pair of end plug portions 22 which, in turn, are inserted into cylinders 40 of first housing part 32 of receptacle connector 12.

First housing part 32 of receptacle connector 12 includes an interior flexible latch arm 42 having a latch hook 42a for latching engagement with latch boss 26 of plug connector 14. The distal end of the latch arm is chamfered, as at 42b, and latch boss 26 is chamfered, as at 26a, so that the latch arm rides over the latch boss when connectors 12 and 14 are mated, until latch hook 42a snaps inwardly into latching engagement with latch boss 26. Latch arm 42 is integral with first housing part 32 and, therefore, the first housing part must be fabricated of a sufficiently resilient material to allow repeated flexing of the latch arm during mating and unmating of connectors 12 and 14.

Second housing part 34 of receptacle connector 12 has a front wall 44 which abuts rear wall 38 of first housing part 32. Front wall 44 has a pair of apertures 46 communicating with a pair of cavities 48. Apertures 46 are aligned with end plug portions 22 of plug connector 14 so that core fibers 20 are exposed within cavities 48 of the second 10 housing part. As seen best in FIG. 1, second housing part 34 is press-fit into a cavity 50 of first housing part 32. A rear portion 52 of the second housing part overhangs a rear portion 54 of the first housing part. A pair of pins 56 extend through rear housing parts 52 and 54 and, along with an additional pair of pins 58, mount connector assembly 10 on an appropriate substructure. For instance, in the fiber optic connector assembly 10 of the invention, the assembly may be mounted on a printed circuit board.

According to the invention, first housing part 32 is fabricated or molded of a first, resilient plastic material to provide the necessary resiliency and flexing for latch arm 42. Second housing part 34 is fabricated of a second plastic material having less resiliency than the first plastic material of the first housing part so that an operative component can be press-fit and retained within cavities 48 of the second housing part. The operative components may be a photodiode or light-emitting diode, for instance, in the fiber optic connector assembly. The second housing may even have to be heated to insert the components. Generally, the plastic material of the second housing part has a lesser coefficient of linear expansion than the plastic material of the first housing part, or the plastic material of the second housing part has a higher elastic modulus than the plastic material of the first housing part. In the exemplary embodiment of the invention, this is accomplished by adjusting the filler material of the plastic material from which the two housing parts are molded, as described below.

More particularly, according to the invention, both housing parts 32 and 34 are fabricated of a polybutylene terephthalate (PBT) resin material. However, first housing part 32 is fabricated or molded of a glass fiber-reinforced PBT resin material, and second housing part 34 is fabricated or molded of a carbon filler-added PBT resin material. It has been found that the plastic or resin material of the first housing part is effective if the glass-fiber content is on the order of 15%, by weight, and the plastic or resin material of the second housing part has a carbon filler content on the order of 40%, by weight. Therefore, with these plastic material parameters, latch arm 42 which is molded integrally with first housing part 32 is provided with excellent flexibility or resiliency and provides a smooth and stable coupling of the plug and receptacle connectors even after repetitive matings and unmatings thereof. On the other hand, second housing part 34 is less resilient and allows operative components, such as optical elements, to be rigidly inserted and retained within cavities 48 by a press-fit, even if the second housing part is heated to allow the components to be inserted into the cavities. By using a carbon filler in the plastic material of second housing part 34, an additional advantage is that the housing part is electrically conductive. Therefore, pins 56 can be ground pins which may be soldered to grounding circuit traces on a printed circuit board to which connector assembly 10 is mounted. Therefore, the optical elements within cavities 50 are electromagnetically shielded.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A connector assembly, comprising:
    a multi-part housing for mating with a complementary connecting device, including
        a first housing part of a first, resilient plastic material and including a resilient latch portion for latching engagement with the complementary connecting device; and
        a second housing part of a second plastic material having less resiliency than said first plastic material and including a cavity for receiving and retaining an operative component of the connector assembly.

2. The connector assembly of claim 1 wherein said second plastic material has a greater amount of filler than the first plastic material.

3. The connector assembly of claim 1 wherein said second plastic material has a lesser coefficient of linear expansion than the first plastic material.

4. The connector assembly of claim 1 wherein said second plastic material has a higher elastic modulus than the first plastic material.

5. The connector assembly of claim 4 wherein said second plastic material has a lesser coefficient of linear expansion than the first plastic material.

6. The connector assembly of claim 1 wherein said first plastic material has a glass fiber filler.

7. The connector assembly of claim 6 wherein said glass fiber filler is on the order of 15%, by weight, of the content of the first plastic material.

8. The connector assembly of claim 1 wherein said second plastic material has a carbon filler.

9. The connector assembly of claim 8 wherein said carbon filler is on the order of 40%, by weight, of the content of the second plastic material.

10. The connector assembly of claim 8 wherein said first plastic material has a glass fiber filler.

11. The connector assembly of claim 10 wherein said glass fiber filler is on the order of 15%, by weight, of the content of the first plastic material, and the carbon filler is on the order of 40%, by weight, of the content of the second plastic material.

12. The connector assembly of claim 1 wherein said first and second plastic materials are of polybutylene terephthalate resin material.

13. The connector assembly of claim 1 wherein said assembly is a fiber optic connector assembly adapted for mating with a complementary fiber optic connector, and the cavity in said second housing part is adapted for receiving an optical element in line with the optical fiber of the mating connector.

14. A connector assembly, comprising:
a multi-part housing for mating with a complementary connecting device, including
a first housing part including a resilient latch portion for latching engagement with the complementary connecting device, the first housing part being molded of a glass fiber-reinforced polybutylene terephthalate rein material; and
a second housing part including a cavity for receiving and retaining an operative component of the connector assembly, the second housing part being molded of a carbon filler-added polybutylene terephthalate resin material.

15. The connector assembly of claim 14 wherein said assembly is a fiber optic connector assembly adapted for mating with a complementary fiber optic connector, and the cavity in said second housing part is adapted for receiving an optical element in line with the optical fiber of the mating connector.

16. The connector assembly of claim 14 wherein the material of the first housing part has a glass fiber filler content on the order of 15%, by weight.

17. The connector assembly of claim 14 wherein the material of the second housing part has a carbon filler content on the order of 40%, by weight.

18. The connector assembly of claim 17 wherein the material of the first housing part has a glass fiber filler content on the order of 15%, by weight.

\* \* \* \* \*